June 14, 1955        R. D. MAY        2,710,666
GAS LINE SAFETY SHUT OFF DEVICE
Filed July 27, 1953
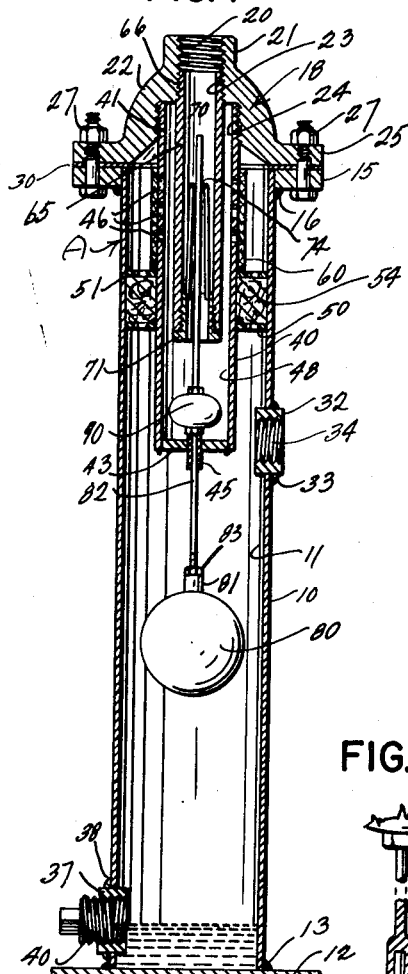
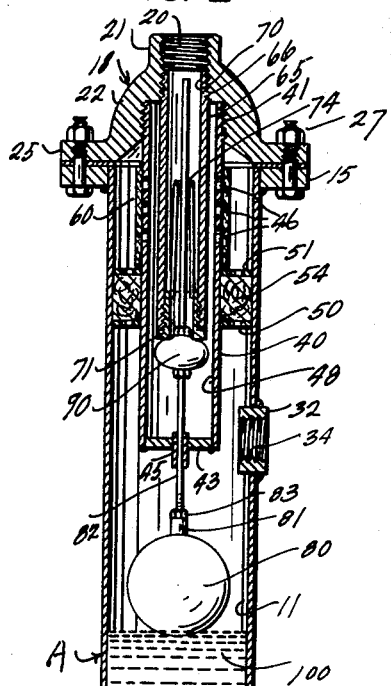
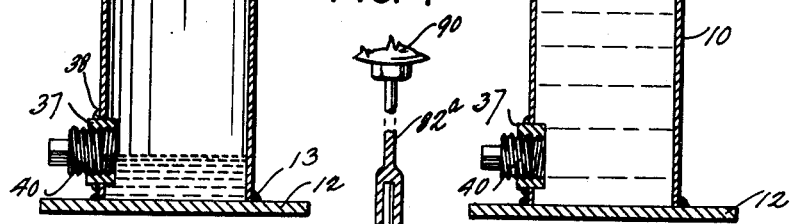
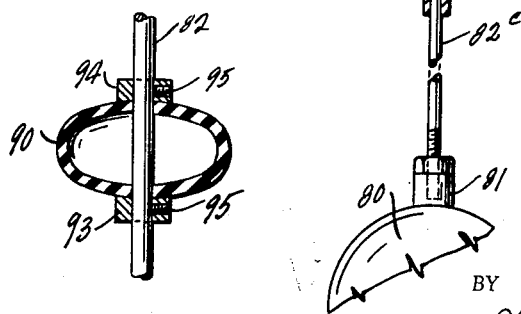
INVENTOR
Russell D. May
BY *Lancaster, Allwine & Rommel*
ATTORNEYS

2,710,666

GAS LINE SAFETY SHUT OFF DEVICE

Russell D. May, Tulsa, Okla., assignor to H2Oil Engineering Corporation, Tulsa, Okla., a corporation of Oklahoma Application July 27, 1953, Serial No. 370,444

8 Claims. (Cl. 183—41)

This invention relates to improvements in safety devices for guarding against explosions in gas lines.

The primary object of this invention is the provision of a quick acting gas line safety shutoff valve mechanism for preventing explosions, danger to life through asphyxiation, fire hazards, and also to prevent slugs of liquid from entering the gas line.

A further object of this invention is the provision of a gas line safety shutoff valve mechanism having improved means associated therewith to clean the gas of backmist, line scale, rust, and to supply dry gas to the desired appliance.

A further object of this invention is the provision of an improved gas line safety shutoff valve mechanism particularly well adapted for use in dwellings, warehouses, offices, schools, and in connection with compressors, drilling rigs, pumping units, etc., and in connection with oil treaters, for the purpose of protecting life and property from the hazards of explosion and fire.

Other objects and advantages of the invention will be apparent during the course of the following detailed description.

In the accompanying drawing, forming a part of this specification, and wherein similar reference characters designate corresponding parts throughout the several views:

Fig. 1 is a vertical cross sectional view taken through the improved gas line safety shutoff valve mechanism showing the valve in opened position for the passage of gas therethrough.

Fig. 2 is a vertical cross sectional view of the improved gas line safety shutoff valve mechanism, with the valve closed, occasioned by rise of liquid in the bottom of its housing.

Fig. 3 is a fragmentary cross sectional view taken through the flexible valve member of the improved gas line safety shutoff device.

Fig. 4 is a fragmentary view, partly in section, showing an improved stem connection between the valve and a float ball, whereby the valve when closed does not have to support the weight of the float.

In the drawing, wherein for the purpose of illustration is shown only a preferred embodiment of the invention, the letter A may generally designate the gas line safety shutoff valve device. It includes a cylindrical body portion 10, which may be of stainless steel or zinc plated steel. It is of uniform diameter from end to end, and provides a chamber 11 therein. It has a base 12 welded thereto at 13, and at the top thereof an attaching flange ring 15 is welded thereto at 16.

A removable head 18 is provided, having an internally screw threaded gas outlet opening 20 at the top thereof. This head 18 has a dome shaped appearance, and includes a nipple 21 in which the opening 20 is formed. The dome shaped body portion 22 is provided with screw threaded sockets 23 and 24 therein and at its lower end it has an attaching flange 25. The flanges 15 and 25 are detachably connected together by bolts 27. This head is preferably of cast metal and may be appropriately plated, particularly inside of the same, to prevent corrosion. A preferably "Neoprene" gasket 30 is clamped between the flanges 15 and 25.

The cylinder 10 is provided with a coupling 32 welded thereto at 33, intermediate its ends, providing an internally screw threaded gas inlet opening 34. Furthermore, the cylinder at the lower end thereof is provided with a coupling 37 welded thereto at 38 and providing an internally screw threaded drain opening 39 adapted to receive a detachable plug 40.

The cylinder 10, at the upper portion of the compartment 11, is adapted to receive the valve and filtering equipment, all of which is carried by the head 18. This equipment includes a pipe, tube or member 40, detachably screw threaded at its upper end at 41 in the screw threaded socket 24 of the head 18. It depends into the compartment 11 of the chamber to a point opposite the inlet opening 34, as shown in Figs. 1 and 2. This pipe 40 is provided with a bottom wall 43 welded at 44 thereto, and the wall 43 supports a bearing sleeve 54 wherein is slidably received a float valve stem to be subsequently described.

At its upper end the tubular member 40 is provided with a series of radial openings or ports 46, through which gas passes from the compartment 11 into the passageway 48 of the tube 40.

A primary filter is provided upon the tube or member 40 intermediate the ends thereof, consisting of apertured stainless steel walls 50 and 51, which are welded to the tube 40. Their outer circumferential edges snugly fit against the internal walls of the cylinder 10. Between these walls 50 there is located a bronze or stainless steel filter pack 54. The gas rises through the compartment 11 and passes through the ducts or ports in the walls 50 and 51 and the filter material 54 for the purpose of primary straining. The gas then enters the compartment 11 above the filter pack. In this portion of the compartment is disposed a felt wiper tube 46 of high quality felt, covering the ports 46, for the purpose of straining backmist, line scale and rust, and preventing the same from entering the compartment 48.

Within the compartment 48 of the tube 40 there is disposed a second tube 65, which is externally screw threaded at its upper end 66 in the socket 23. It is provided with a compartment or passageway 70 opening into the outlet opening 20. At its lower end the tube 65 is provided with a valve seating sleeve 71 screw threaded therein, upon which the valve is adapted to seat. This valve sleeve is provided with a valve stem supporting spider 74 therein.

Referring to the float and valve mechanism, the same includes a stainless steel ball valve 80, having a nipple 81 thereon for detachably receiving the valve stem 82 which radially extends therefrom and is held in place thereupon by means of a locknut 83. The valve stem 82 slidably seats within the sleeve bearing 45 and extends axially through the tubes 40 and 65; being supported at its upper end in the sleeve 65 by means of the spider 74.

The valve stem 82 supports the valve 90. The latter operates in the passageway 48 of the pipe or member 40 between the wall 43 and the valve seat 71 for the purpose of shutting off the passageway 70 of the sleeve 65 to entrance of gas when liquid in the cylinder 10 reaches a predetermined level.

The improved valve 90 has a number of novel characteristics. It is formed of flexible waterproof material, such as "Neoprene" or rubber or any flexible plastic material which will serve the same purpose. It is normally of ball shaped appearance, but is squeezed into a flattened oval shape, as shown in Fig. 3, by means of stop washers 93 and 94 which are detachably held upon the valve stem 82 by means of Allen head set screws 94. This shape of the valve enables a quick seating action and an adjustment of the space between the external periphery of the valve 90 and the internal walls of the compartment 48, so that a quick pickup closing of the valve results from slip stream flow of gas past the valve.

Referring to action of the valve, the wet gas enters the opening 34 and passes into the compartment 11 of the cylinder 10. It is strained through the metallic straining material 54 and passes into the compartment of the cylinder thereabove. From thence it is filtered through the felt material 60, and the dry gas passes through the ducts or ports 46 to the tube passageway 48. There is a rush of gas downwardly through this tube 48 and thence upwardly into the passageway 23 of the tube 65 and into the gas line.

As the water or liquid 100 rises in the lower part of the cylinder 10 the flattened oval shaped flexible valve 90 is lifted by the float and when the valve has moved to a predetermined distance short of the valve seat 71, the rush of gas will pick up and forcefully shut the valve against its seat, for a complete sealing of the gas against passage into the gas line.

The shape of the valve also provides for a proper cushioning effect to prevent distortion of the valve rod.

In order to permit functioning of the gas line safety valve device, after the valve has closed, it is necessary to drain the liquid by removal of the plug 40. The weight of the valve and the float will open the valve and drop them to the position shown in Fig. 1.

Under some circumstances it may be desirable to free the valve, when closed, of the weight of the ball float 80. Normally the pressure of the gas in the cylinder 10 below the valve will be sufficient to maintain the valve closed. However, to lighten the load upon the closed valve, I propose to provide a valve stem portion 82$^a$ for the mounting of the valve 90 thereon, having a lower sleeve like socketing extension 82$^b$ for slidably receiving, in the passageway thereof, the upper end of the stem portion 82$^c$ which is directly connected to the float 80, as shown in Fig. 4. Under these circumstances when the valve closes the ball 80 will remain in float position on the liquid 100 and the valve 90 and the stem portions 82$^a$ and 82$^b$ will rise, without entire disconnection of the stem 82$^c$ from the socket or passageway of the portion 82$^b$. Thus, the valve need only support its own load and that of the stem portion directly connected thereto; the ball float 80 being free to float upon the liquid.

It will be noted from the assemblage of parts that removal of the head 18 exposes all of the parts for access thereto. If desired, the wall 43 instead of being welded in place may be screw threaded, so that access may be readily had to the valve and to the valve seat.

Various changes in the shape, size and arrangement of parts may be made to the form of invention herein shown and described, without departing from the spirit of the invention or scope of the claims.

I claim:

1. A gas line safety shutoff valve device comprising an elongated vertical cylindrical housing having a chamber therein and a gas inlet opening intermediate the ends thereof and a gas outlet opening at the upper portion thereof above the gas inlet opening, a valve seat supporting tube connected to said housing having a passageway opening to the outlet opening and extending down into the chamber of said housing, a second tube connected to said housing and depending into the housing chamber externally of the first mentioned valve seat providing tube and spaced therefrom and defining a chamber extending to a point below the valve seat tube, means closing the lower end of said second tube, the second tube having inlet ports therethrough opening into said tube and the housing chamber, a float in said housing chamber below said second tube, a stem upon said float bearing in the means which closes the lower end of the second tube, said stem extending into the chambers of both of said tubes, and a flexible valve mounted upon said stem in the second tube below the valve seat tube.

2. A gas line safety valve shutoff device as described in claim 1 wherein the valve is of flexible hollow construction of oval vertical cross section.

3. A gas line safety shutoff valve device as described in claim 1 wherein filtering means is provided in the housing compartment surrounding said second mentioned tube and below the inlet ports to the second tube compartment.

4. In a gas line safety shutoff valve mechanism the combination of a vertical housing having a chamber therealong provided with a lateral gas inlet opening and an upper gas outlet opening, a tube supported by said housing and depending into said chamber having a valve seat at the lower end thereof and a passageway opening to said gas outlet opening, a second tube carried by said housing and depending into the chamber thereof receiving the first mentioned tube in spaced relation therein, said second tube depending below the valve seat of the first mentioned tube and being closed at its lower end, a float in the lower part of the chamber of said housing below said tube having a stem bearing in the closed end of the second mentioned tube, the stem extending into the passageways of both of said tubes, a flexible sealing valve upon said stem below the valve seat and disposed within the chamber of the second mentioned tube, said second mentioned tube having lateral ports therethrough to its chamber above the valve seat of the first mentioned tube, a primary filtering device in the chamber of said housing below said ports and externally surrounding said second mentioned tube and blocking off the chamber of the housing for the filtering of gas therethrough as it travels to the upper part of the housing chamber, and a filtering sleeve mounted upon the second mentioned tube and covering said lateral ports through which gas flows from the housing chamber to the chamber of the second mentioned tube.

5. A gas line safety shut off device comprising an elongated vertical housing having a chamber therein and a gas and liquid inlet opening thereto and an upper gas outlet opening, a tube connected to the housing having a passageway leading directly to the gas outlet opening, said tube extending downwardly into the chamber of said housing and having a bottom opening to said passageway defining a valve seat, a second tube mounted upon the housing and depending into the housing chamber and having a chamber which receives the first mentioned tube therein in spaced relation, the second tube chamber extending to a point below the valve seat of said first mentioned tube, closure means for the lower end of the second tube, said second tube having inlet port means leading into the chamber thereof from the housing chamber, float means in the housing chamber below the second tube closure means, said float means having a stem extending into the chamber of the second mentioned tube, and a valve mounted upon said stem and movable with the float means and stem for seating upon the valve seat of the first mentioned tube to close off passage of gas into the passageway of the first mentioned tube.

6. A gas line safety shut off valve device as defined in claim 5 wherein filter means is provided in the housing separating the chamber thereof from the inlet port means to the chamber of the second mentioned tube for filtering of gas passing into the chamber of the second tube.

7. A shut off valve device as defined in claim 5 wherein the chamber of the second tube below the valve seat in the first mentioned tube has a definite space restriction with respect to the valve whereby the slip stream of gas passing through and towards the valve seat will pick up the valve and snap it shut as the valve closely approaches the valve seat.

8. A gas line safety shut off device as defined in claim 5 wherein the space between the inner walls of the chamber of the second tube immediately below the valve seat are so restricted with respect to the facing surfaces of the valve that the slip stream of air passing through the chamber of the second tube towards said valve seat will snap shut the valve as the float elevates the valve to a point closely adjacent the valve seat, said valve being formed of flexible hollow material with means to adjust the lateral dimension thereof to vary the space restriction between the same and the adjacent inner walls of the second tube below the valve seat.

References Cited in the file of this patent

UNITED STATES PATENTS

| | | |
|---|---|---|
| 21,332 | Fuller | Aug. 31, 1858 |
| 1,116,931 | Schutt | Nov. 10, 1914 |
| 1,499,710 | Weisgerber | July 1, 1924 |